(12) United States Patent
Bezuidenhout et al.

(10) Patent No.: US 8,714,363 B2
(45) Date of Patent: May 6, 2014

(54) SUPPLYING FILTERED GRANULAR MATERIAL USING AN ANGLED SIEVE

(75) Inventors: Nick Bezuidenhout, Greenville, SC (US); Denis Perinet, Simpsonville, SC (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 191 days.

(21) Appl. No.: 13/235,879

(22) Filed: Sep. 19, 2011

(65) Prior Publication Data

US 2013/0068667 A1 Mar. 21, 2013

(51) Int. Cl.
*B07B 13/16* (2006.01)
(52) U.S. Cl.
USPC ........... 209/247; 209/241; 209/245; 209/276; 209/365.1
(58) Field of Classification Search
USPC ........................ 209/241, 245, 247, 276, 365.1
See application file for complete search history.

(56) References Cited

U.S. PATENT DOCUMENTS

| | | | | | |
|---|---|---|---|---|---|
| 2,125,812 | A | * | 8/1938 | Robertson | 209/129 |
| 2,139,435 | A | * | 12/1938 | Beattie | 209/44.1 |
| 2,517,508 | A | * | 8/1950 | Schroeder | 209/283 |
| 6,027,608 | A | * | 2/2000 | Gassner | 162/2 |
| 7,160,443 | B2 | * | 1/2007 | Frommann | 210/158 |
| 2009/0255955 | A1 | * | 10/2009 | Jung | 222/63 |
| 2013/0068667 | A1 | * | 3/2013 | Bezuidenhout et al. | 209/247 |

* cited by examiner

*Primary Examiner* — Terrell Matthews
(74) *Attorney, Agent, or Firm* — Reising Ethington P.C.

(57) ABSTRACT

A method and apparatus for supplying filtered slush molding powder or other granular material using a material feeder and angled sieve. The feeder includes a feeding member for moving the granular material, a feeder loading region, and a feeder unloading region. The sieve is positioned relative to the feeder unloading region so that it receives the granular material exiting the feeder. The sieve is positioned at an angle of inclination greater than zero degrees. An agitator that causes vibration of the sieve can be included to help sift the granular material through the angled sieve.

10 Claims, 2 Drawing Sheets

SUPPLYING FILTERED GRANULAR MATERIAL USING AN ANGLED SIEVE

TECHNICAL FIELD

The present disclosure relates generally to powder slush molding, and more specifically to the feeding and preparation of powder slush for the molding process.

BACKGROUND

Powder slush molding of vehicle interior components and other manufactured articles typically uses a charge box filled with a powder or other granular material that is then applied against a heated mold surface that melts some of the powder to form the article. The slush powder particles may vary in size; e.g., some may be colloid, clay, silt, or sand-size. In some applications, variations in particle or powder size may result in a substandard end product. Therefore, it may be desirable to filter the slush powder prior to casting to limit the particle size within a given batch of material and/or to separate out clumps of particles or other granular material from the powder. One method of filtering such unwanted particles from the batch of material involves the use of a sieve. The sieve may be used to segregate unwanted particles from the wanted material prior to filling the charge box with the powder. The sieve may use a woven screen such as a mesh or net that typically has holes of uniform size; and the hole size of the mesh is selected based upon what particle sizes should be restricted from the batch of material.

In industrial manufacturing, one device used in moving large quantities of powder or other dry particulate material is a screw conveyor. The screw conveyor (a.k.a., an auger conveyor) is a mechanism that may use a rotating helical screw blade (a.k.a., a "flighting") to move or feed the granular materials, usually within a hollowed housing (such as a tube or a trough). Implementations of the helical screw blade include those with and without a shaft. When used for slush molding, the screw conveyor may feed the powder to a hopper where the sieve is located to filter the powder as it enters the hopper. The filtered material in the hopper is then used to recharge the powder box as appropriate.

As noted above, a typical slush molding process generally involves both feeding and filtering the powder so as to supply powder of a desired particle size to the charge box (a.k.a. as powder box). The charged powder box can be joined with the mold by turning the mold upside down and placing an open side of the mold over top an open end of the powder box to form a sealed chamber. In this molding process, the powder box is situated below the mold as the mold heats, thereby preventing the slush powder from making contact with the mold as the mold temperature rises. When the mold reaches the preferred slush powder casting temperature for the specific slush powder being processed, the powder box and the mold may be jointly rotated in one or more axes to dump the powder into the entire mold (e.g., all the folds, recesses, etc. of the mold). Next, the mold may be inverted to such that any unmelted falls back into the powder box. The mold and powder box are then separated and the mold may be cooled by various methods including being sprayed with a fine mist of water and/or air cooled to a desired stripping temperature for the specific slush powder. Once the stripping temperature is reached, the cooled solid skin may be removed. One common application of powder slush molded skins is in the production of interior trim and dashboards for the automotive industry.

SUMMARY

In accordance with one aspect of the invention, there is provided an apparatus for supplying filtered powder or other granular material. The apparatus includes a feeder and sieve, wherein the feeder has a feeder loading region, a feeder unloading region, and at least one feeding member constructed and arranged so as to move a granular material from the feeder loading region to the feeder unloading region. The sieve is positioned relative to the feeder unloading region such that it receives the granular material from the feeder. The sieve comprises a mesh for separating out larger granules from the granular material, and the mesh is positioned at an angle of inclination greater than 0 degrees with respect to horizontal.

In one embodiment, the apparatus may also comprise an agitator, the agitator arranged to induce vibration to the sieve that causes sifting of the granular material through the sieve.

In another embodiment of the apparatus, the agitator may be coupled to the sieve.

In another embodiment, the apparatus may further include a sift hopper having one or more walls, a bottom member coupled to the one or more walls, and a passageway, the sieve being mounted in the sift hopper and the passageway being positioned relative to the sieve in order to receive the sifted granular material, and the agitator may be coupled to the sift hopper.

In another embodiment of the apparatus, the feeding member may be a screw conveyor that comprises a screw blade and a housing, the housing further comprising a housing inlet near the feeder loading region and a housing outlet near the feeder unloading region, wherein the screw blade moves the granular material within the housing from the housing inlet to the housing outlet.

In one embodiment where the feeder is a screw conveyor, the agitator may be coupled in the vicinity of the screw blade and near the housing outlet such that the agitator impacts the sieve as the screw blade rotates.

In another embodiment of the apparatus, the sieve may be at an angle of inclination within a range of 20 to 60 degrees with respect to horizontal.

In another embodiment of the apparatus, the mesh of the sieve may comprise a plurality of openings, wherein the openings are rectangular with sides between 1.0 to 2.0 millimeters in length.

In yet another embodiment, the feeder may comprise two or more feeder unloading regions.

Also, in accordance with another aspect of the invention, there is provided a method of supplying filtered powder or other granular material using a feeder having a feeding member, a feeder loading region, and a feeder unloading region. The method includes the steps of: moving a granular material through the feeder using the feeding member, the granular material moving between the feeder loading region and the feeder unloading region; and filtering the granular material after it is exits from the feeder unloading region using a sieve oriented at an angle of inclination greater than 0 degrees with respect to horizontal such that at least some of the granular material moves over the surface of the mesh due to its angle of inclination.

According to an embodiment of the method, the angle of inclination of the mesh may be within a range of 20 to 60 degrees with respect to horizontal.

In an embodiment of the method, the filtering step further comprises sifting the granular material through the sieve by shaking the sieve using an agitator.

In another embodiment of the method, the feeding member may comprise a screw blade, a housing, and the agitator coupled in the vicinity of the screw blade to impact the sieve as the screw blade rotates, the housing further comprising a housing inlet near the feeder loading region and a housing outlet near the feeder unloading region, wherein the screw blade moves the granular material within the housing from the housing inlet to the housing outlet.

Within the scope of this application it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments of the invention will hereinafter be described in conjunction with the appended drawings, wherein like designations denote like elements, and wherein.

DETAILED DESCRIPTION OF THE PREFERRED EMBODIMENT(S)

Figure 1:
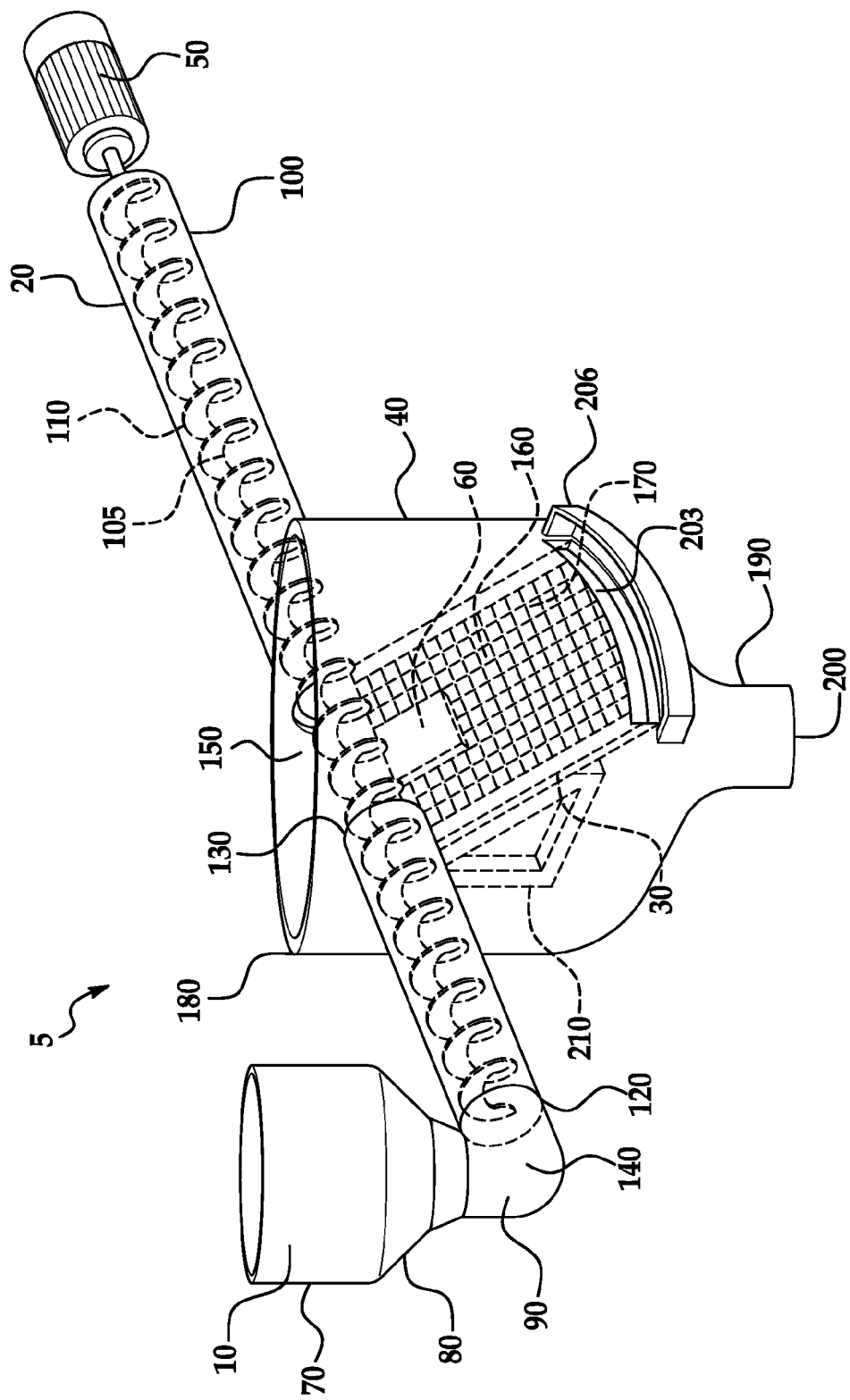
FIG. 1 is a perspective view of a material sifting system comprising a feeder, a sieve, a hopper, and an agitator.

Described and shown herein is a method and apparatus for supplying filtered granular material that uses a material feeder and an angled sieve for filtering the granular material. The feeder may move the granular material from a hopper or a bin to the sieve. And the sieve itself may be inside of another hopper. The sieve comprises a mesh with a plurality of openings, and the mesh is positioned at an angle of inclination greater than zero, relative to horizontal (i.e., relative to 'level' ground). The method and apparatus may further include an agitator that induces shock and/or vibration into the mesh of the sieve to facilitate sifting of the granular material through the sieve. Depending on the application, the granular material may include on or more of the following types of granular material: plant seed, grain, boulders, cobble, gravel, sand, silt, clay, colloid, powders, dust, ashes, grits, cinders, and soil. And although the method and apparatus discussed herein has a broad range of applicability to different industrial processes for material feeding and filtering, the illustrated embodiment and description below are directed to powder slush molding as it is used for automotive applications.

As discussed below, the drawings illustrate a material sifting apparatus that includes a material feeder, angled sieve, and agitator. The feeder comprises a feeding member, a feeder loading region, and one or more feeder unloading regions. The feeding member includes any apparatus that may move a granular material using gravity and/or any other mechanical or electro-mechanical means. For example, the feeding member may be a trough that is elevated at the feeder loading region and lower at the feeder unloading region. Thus, granular material slides down the feeding member under the force of gravity and may be assisted by vibration. A cross-section of the trough may be cylindrical, tubular, curved, angular, etc. The feeding member also may be a belt conveyor. For example, the belt conveyor may comprise two or more rollers and a belt where the belt may be a continuous loop of material (e.g., rubber) which rotates about the rollers. Thus, as the rollers turn, the belt progresses. The belt may carry the granular material from the feeder loading region to the feeder unloading region. The belt conveyor may further comprise a plurality of buckets, bins, or rails coupled to the belt which facilitate the movement of the granular material. Another embodiment of the feeding member may be a screw conveyor. The screw conveyor (or auger conveyor) comprises a screw blade, and may or may not comprise a shaft about which the screw blade is coupled (i.e., shafted or shaftless). The screw blade may be shaped as a single continuous helical screw or it may be segmented and/or composed of angular blades. The screw conveyor may convey granular material in a trough from the feeder loading region to the feeder unloading region, and a cross-section of the trough may be cylindrical, tubular, curved, angular, etc.

The material sifting apparatus also includes the sieve which may comprise a mesh such as a woven screen. The mesh may be rigid or flexible. In one embodiment, the sieve may further include a frame or structure used to support the mesh. The mesh may have cells or openings for obstructing granules exceeding a predetermined size. The openings may be uniform in size and shape. As will be appreciated by one skilled in the art, the size of the opening dictates what size granule will and will not be able to pass through. For example in one embodiment where the granular material to be sifted is slush powder, the openings may be rectangular and have sides in the range of 1.0 to 2.0 millimeters in length. In one particular embodiment using for powder slush molding, the sides of the rectangular openings are 1.5 millimeters on each side. Circular or other shaped openings can be used in lieu of or in addition to rectangular openings. The dimensions of the mesh itself may vary in size according to the application (e.g., length, width, and depth). Where a frame is used, the frame may be used to position the mesh at the desired angle of inclination. The shape of the frame may vary (e.g., circular, elliptical, or rectangular). The mesh may be coupled to the frame by any suitable means (such as welding, bonding, fastening, connecting, binding, etc.).

The agitator used in the material sifting apparatus may be implemented by any suitable means for producing vibration or shaking of the screen so as to help sift the granular material through the sieve. This includes devices that provide reciprocating, orbital or other motion of the sieve, and including devices that impart the motion either directly to the sieve or indirectly through its mounting support or otherwise. This also includes using a devices dedicated to providing this motion, or utilizing a source of mechanical power already existing on the apparatus to supply the motion. For example, in the illustrated embodiment discussed below, the shaking or vibration of the sieve can be provided by impacting it using an agitator mounted to the feeder.

Now turning to FIG. 1, there is shown a more specific embodiment of the material sifting apparatus 5 as it might be used for powder slush molding using a meltable powder as the granular material. The embodiment 5 of FIG. 1 comprises a supply container 10, the feeder (here, a screw conveyor) 20, the sieve 30, a sift hopper 40, a motor 50, and an agitator 60. The supply container 10 may be a storage container having one or more walls 70, a bottom member 80 coupled to the one or more walls 70, and a passageway 90 in the bottom member 80 or in one of the walls 70 to dispense the powder through the use of gravity. It may or may not include a lid. Also, it may have a vibratory mechanism (not shown) to further facilitate the dispensing of the granular material. In other embodiments, the supply container 10 may be a pliable feed bag. In addition, the feed bag may be massage, kneaded, or manipulated to facilitate dispensing of the granular material.

In the embodiment of FIG. 1, the feeder 20 is a screw conveyor comprising a housing 100 and the feeding member 105 (here, a screw blade 110). The housing 100 may be a tubular (as shown in FIG. 1) or a trough-like structure at least partially enclosing the screw blade 110, coaxial with (or parallel to) the screw blade 110, and extending longitudinally at least partially around the screw blade 110. The shape and diameter of the housing 100 may vary; however, in the embodiment shown the housing 100 is tubular and has a diameter of approximately 6 centimeters. The housing 100 may be oriented generally horizontally; i.e., parallel with level ground. In FIG. 1, the angle of inclination is zero degrees. However, depending upon the application, housing 100 may also be oriented with angles of inclination between 0 degrees and 90 degrees. The housing 100 may further comprise a housing inlet 120 and a housing outlet 130. The housing inlet 120 may be at one end of the housing 100 near the feeder loading region 140, and the housing outlet 130 may be near the feeder unloading region 150 at the distal end of the housing 100 or somewhere inbetween (as it is shown in FIG. 1). Where the housing 100 is inclined to utilize gravity, the housing outlet 130 may be lower than the housing inlet 120. As shown in FIG. 1, the housing inlet 120 may be coupled to the supply container 10 to receive the powder therefrom and may be coupled by any suitable means (e.g., welding, bonding, fastening, connecting, binding, etc.). In some embodiments, the housing inlet 120 may be sealed to the supply container 10; e.g., to minimize the loss of powder due to it becoming airborne (e.g., dust). Where the housing inlet 120 is not coupled to the supply container 10, it may merely comprise an opening in the housing 100 (e.g., the housing inlet 120 may be larger in diameter than the passageway 90 of the supply container 10—thus, minimizing spillage of the material during the transfer from the supply container 10 to the housing 100). The housing outlet 130 may be any opening in the housing 100. It may be in the bottom and/or side of the housing 100 such that the material is gravity-fed as it is emptied by the screw blade 110 from the housing 100; or in the exemplary embodiment shown in FIG. 1, it may be a 360 degree opening in the housing 100. The housing outlet 130 may further comprise a mesh or guard (not shown) at the opening. The mesh or guard may contain rectangular holes that are larger than 8 millimeters. These holes may allow the powder to pass through unobstructed, but simultaneously aid in the prevention of human entanglement (e.g., a human finger). In one embodiment, the mesh or guard holes are rectangular and may range in size between 8 and 10 millimeters. Holes that are circular or other shapes can be used in lieu of or in addition to rectangular openings.

Screw blade 110 shown in FIG. 1 may be shafted or shaftless. Where the screw blade 110 is shafted it may comprise a continuous wound blade (or flighting) circumferentially spiraled around and coupled to a central shaft. Where the screw blade 110 is shaftless (as shown in FIG. 1), it may be fashioned similarly, however, the shaft may be absent. The size of the screw blade shaft and flighting may vary. The pitch of the blade may vary. Similarly, the number of turns of the screw blade 110 within any given unit measure (e.g., within 1 meter) of the screw blade's 110 length may vary. While the diameter of the screw blade 110 may vary; in FIG. 1, it may be restricted by the size (and/or diameter) of the housing 100. The screw blade 110 may have minimal clearance between it and the interior surface of the housing 100. Generally, the clearance between the radially outermost edge of the screw blade 110 and the housing 100 is proportionately larger than the largest expected granules to be moved; thus, large granules are less apt to become lodged between the screw blade 110 and the housing 100 while the screw blade 110 rotates. In FIG. 1, the screw blade 110 is shaftless; its outer diameter is approximately 3.5 centimeters, and the screw blade pitch is flat (or zero degrees). The housing 100 of FIG. 1 is shown having a diameter of approximately 6 centimeters. And, as shown, the screw blade 110 and housing 100 are parallel, but not coaxial. The screw blade 110 may be made of metal or plastic. The screw blade 110 may be composed of a material with a hardness (e.g., using a Mohs or Rockwell scale) greater than that of the granular material it is to move (thereby extending the useful-life of the screw blade 110). The screw blade 110 may be mechanically coupled to the housing 100 (e.g., on a race bearing (not shown)). Additionally, it may be coupled to the motor 50. In one embodiment, the screw blade 110 may be only coupled at one end; i.e., only coupled to the motor 50—thus, the screw blade 110 may be cantilevered from the motor 50.

Figure 2:
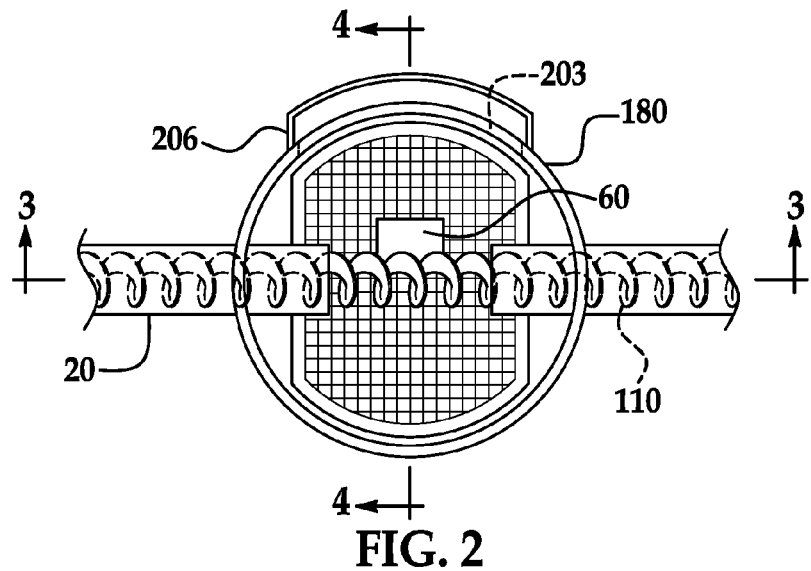
FIG. 2 is a partial plan view of the material sifting system of FIG. 1.
Figure 3:
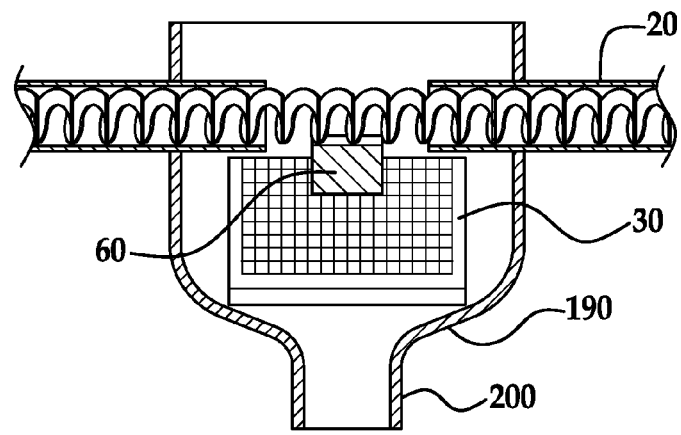
FIG. 3 is a sectional view along section lines 3-3 of FIG. 2.
Figure 4:
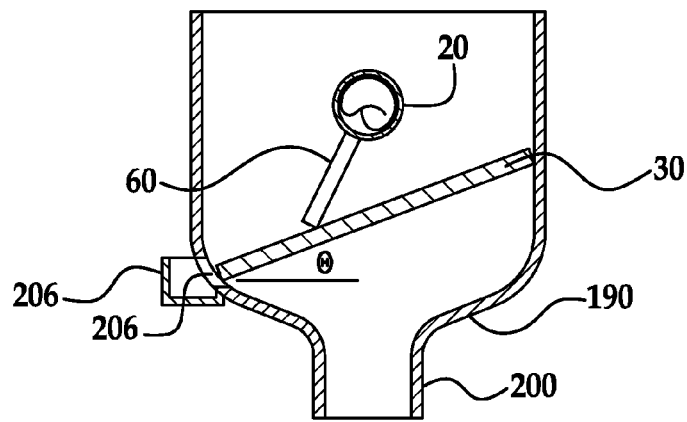
FIG. 4 is a sectional view along section lines 4-4 of FIG. 2.

As shown in FIGS. 2-4, the sieve 30 may be positioned inside of the sift hopper 40. The sieve shown in FIG. 1 comprises a mesh 160 and a frame 170. The mesh 160 may be comprised of evenly spaced and equally shaped rectangular openings having sides of approximately 1.5 millimeters. The outer dimensions may be rectangular; the mesh 160 shown in FIG. 1 is approximately 25 cm×25 cm. The frame 170 shown in FIG. 1 also may be rectangular, peripherally bounding the mesh 160. In FIG. 1, the mesh 160 and frame 170 may be positioned at an angle THETA (Θ) inside the sift hopper 40 with respect to horizontal or level ground. The sift hopper 40 may be of similar construction as the supply container 10. The sift hopper 40 may be a container and may comprise one or more walls 180, a bottom member 190 coupled to the one or more walls 180, and a passageway 200 in the bottom member 190 or in one of the walls 180 to dispense granular materials through the use of gravity. The sift hopper 40 may further comprise an opening 203 to the exterior of the walls 180 or to the exterior of the bottom member 190 to permit the larger, separated out particles to exit the hopper 40. A receptacle 206 may be coupled thereto at the opening 203 to catch the separated out particles for disposal or re-use. In FIG. 1, the wall 180 of the sift hopper 40 is shown as cylindrical, the bottom member 190 is shown as generally frusto-conical, the passageway 200 is shown as cylindrical, and the receptacle 206 is shown as rectangular; however, it will be appreciated by those skilled in the art that these shapes are merely exemplary and that other shapes may also be used. In FIG. 1, the sift hopper 40 does not include a lid; however, it could in other embodiments. The outer dimensions of the sieve 30 are circumscribed within the cylindrical wall 180 of the sift hopper 40 (see also FIG. 4). Filtering of the particles may be accomplished with the angle THETA between 0 and 90 degrees. In one embodiment, the angle THETA may be a range between 20 and 60 degrees. In FIG. 1, the angle THETA is approximately 35 degrees. The sieve 30 in FIG. 1 may be coupled to the sift hopper 40 so that the frame 170 and mesh 160 will maintain their angular orientation THETA. The sieve 30 may be coupled using weldments, bonds, fasteners, connectors, binders, etc. In one embodiment, the angular position of the sieve 30 may be adjustable. For example, the frame 170 of the sieve 30 may be supported by a platform 210. The platform 210 may comprise an arrangement of legs and feet. For example, an L-shaped platform may support the frame 170 wherein the platform 210 comprises a leg and a foot each on opposing sides of the frame 170. The frame 170 may be pivotable where it is coupled to the leg and the angle of inclination of the frame 170 may be adjustable thereby. For example, the frame 170 may have axles extending outwardly on opposing sides, and the platform 210 may have a bearing race to receive the axles. In addition, the platform 210 and/or frame 170 may be fixed at a selected angle of inclination (e.g., by a lock, latch, pin, clamp, etc.). In one embodiment, the platform 210, the frame 170, and the mesh 160 may rest upon the bottom member 190 of the sift hopper 40. In addition, the platform 210 also may be coupled to the sift hopper 40 so that it and/or the sieve 30 maintain their original orientation. In another embodiment, the sift hopper 40 may use the opening 203 and the receptacle 206 to collect granules which did not pass through the sieve 30. Thus, the receptacle 206 may be aligned with or near to the bottom of the sieve 30 at the lowermost end of the frame 170 and/or mesh 160. In other embodiments, the receptacle 206 may be or may not be coupled to or in contact with the sift hopper 40. The receptacle 206 may include any container such as a box, bin, tray, trap, bag, sack, catchment, or pouch.

Now turning to the motor 50 of FIG. 1; the motor 50 may be used to rotate the screw blade 110 within the housing 100. Any type of motor 50 may be used; in FIG. 1, a 3-phase, alternating current (AC) motor 50 is shown. The motor 50 may be coupled to either the shaft (in shafted screw conveyors) or to one end of the screw blade 110 itself (in shaftless screw conveyors). In either instance, the motor 50 also may be coupled indirectly to the screw blade 110 (e.g., using one or more gears). And the motor 50 may be computer controlled; e.g., so that the rate of rotation delivers a measured quantity of material within a specified amount of time.

As shown in FIG. 1, the feeder 20 and angled sieve 30 may also include an agitator 60 (see FIGS. 2-4). The agitator 60 may comprise a flap of material coupled to the screw blade 110 in one or more places. In FIG. 1, the flap is coupled to the screw blade 110 in two places (on two turns of the screw), near the outermost radial edges of the screw blades 110. The shape and dimensions of the agitator 60 may vary; however, in FIG. 1, the agitator 60 is rectangular with approximate dimensions of 5 cm×10 cm. The agitator 60 could be circular, oval, square, trapezoidal, or any other shape having one or more curved and/or angular edges. In FIG. 1, the housing 100 of the screw conveyor 20 is approximately 7 centimeters above the sieve 30; thus, as the screw blade 110 rotates, the agitator 60 rotates; and as the agitator 60 rotates, it impacts the mesh 160 of the sieve 30 once per rotation. The agitator 60 may be made of metal, plastic, rubber, or any other naturally occurring or man-made material; and it may be rigid or pliable. The agitator 60 may coupled to the screw blade 110 (or the shaft, in shafted screw conveyors) in various ways; e.g., it may be clipped, adhered, bolted, buckled, buttoned, clasped, latched, locked, riveted, screwed, snapped, adhered, taped, chained, cinched, hitched, pinned, shackled, tacked, cemented, fused, soldered, or in any other way fastened, bound, or welded. In addition, agitator 60 need not be a flap; instead it may comprise any other device which induces one or more shocks or vibrations into the mesh 160; e.g., it may be a mechanical or electro-mechanical device. In one embodiment, the agitator 60 may be any device which comprises an electric motor with an unbalanced mass on its driveshaft—thus, as the shaft rotates, it wobbles; and as it wobbles, it induces a vibration into the mesh 160 through the point of contact. In other embodiments, it may impact vibration using a reciprocating plunger or other member. In all embodiments, the agitator 60 may directly or indirectly shock and/or vibrate the mesh 160 of the sieve 30. For example, the agitator 60 may shock or vibrate the frame 170 of the sieve 30, thus moving the mesh 160. Or the agitator 60 may shock or vibrate the sift hopper 40 which carries the sieve 30, which then in turn indirectly induces shock or vibration into the mesh 160.

The use of the angled sieve 30 and/or the agitator 60 are an improvement over the performance of traditional feeders and horizontal sieves (i.e., 0 degree inclination) arrangements. Where the sieve 30 is inclined, unwanted granules (e.g., those larger than the mesh openings) have a tendency to roll off of the mesh 160 due to gravitational forces. These unwanted granules then may be collected and may be either recycled or disposed. However due to electrostatic forces (e.g., between the powder granules and the mesh) and/or the exterior shape of the particular granule, some granules may become ensnared or entangled in the mesh 160 and may not roll off. In addition, even wanted granules (e.g., those smaller than the mesh openings) may clump together, obstruct the mesh opening, and not pass through. And while granules are passing through, rolling off, and clogging the openings of the mesh 160, the feeder 20 may continue to deliver the granular material to the sieve 30. Without intervention, the mesh 160 in the sieve 30 may eventually become clogged and its filtering or sifting ability is hampered. Where the agitator 60 is used, the sifting of the powder may be accelerated. In addition, those smaller granules which but for having clumped together may otherwise have passed therethrough, may be shaken apart and thereby pass through. The agitator 60 may additionally free the larger granules from the angled sieve 30 so that they no longer clog the mesh 160—facilitating their tendency to roll off. Without the angled sieve 30 or the agitator 60, the mesh 160 may eventually clog and become inoperative. This typically necessitates human interaction and a stoppage of the feeder 20. Thus, both jointly and severally, the angled sieve 30 and agitator 60 may enable the material sifting apparatus 5 to operate for longer periods of time without human interaction.

The advantages of the agitator 60 shown in the embodiment of FIG. 1 include the elimination of an additional power source, minimal additional spatial requirements, and a cost effective alternative to known vibrating mechanisms. The power source actuating the agitator 60 is the same motor 50 driving the screw blade 110. Since the agitator 60 may be constructed to be relatively light-weight (as compared to the screw blade 110), the additional load placed on the motor 50 is negligible. Therefore, the motor 50 may rotate both the screw blade 110 and the agitator 60 with little to no additional depreciation of the motor's 50 performance. Stand-alone vibrating mechanisms which have their own motor, require additional power (e.g., electrical, fuel, etc.). Also, the spatial requirements and costs of the agitator 60 shown in FIG. 1 are minimal when contrasted against stand-alone vibrating mechanisms which: may require a large spatial footprint around the device for installation and maintenance; may require additional hardware to mount or install; may be heavy; and may be costly to purchase and to maintain. The agitator 60 shown in FIG. 1 requires minimal additional space to use, install, and maintain, and it is inexpensive to purchase and maintain.

In another embodiment of the screw conveyor 20, the housing 100 may have multiple housing outlets 130 along a single screw blade 110 having a single motor 50. For each housing outlet 130, there may be an additional sift hopper 40 and angled sieve 30. Furthermore, each sift hopper 40 may comprise a trap. In addition, multiple agitators 60 may be coupled to the screw blade 110 near each housing outlet 130. In this implementation, larger volumes of sifting may occur simultaneously, thus increasing production.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An apparatus for supplying filtered granular material, comprising:
 a longitudinally extending feeder having a feeder loading region, a feeder unloading region longitudinally spaced from the feeder loading region, and a feeding member configured to move dry slush molding powder from the feeder loading region to the feeder unloading region;
 a sieve positioned below the feeder unloading region, the sieve comprising a mesh for separating out larger granules of the dry slush molding powder, the mesh being positioned at an angle of inclination greater than 0 degrees with respect to horizontal; and
 an agitator configured to induce vibration into the sieve, wherein the feeder is a screw conveyor and the agitator is a flap coupled to a screw blade of the screw conveyor and configured to rotate with the screw blade and contact the sieve with each rotation of the screw blade to induce the vibration into the sieve.

2. The apparatus set forth in claim 1, further comprising a sift hopper carrying the sieve and having a passageway positioned to receive the granules of dry slush molding powder that pass through the mesh.

3. The apparatus set forth in claim 2, further comprising a receptacle positioned to receive, through an opening in a wall of the hopper, the granules of dry slush molding powder that do not pass through the mesh.

4. The apparatus of claim 1, wherein the angle of inclination of the mesh is within a range of 20 to 60 degrees with respect to horizontal.

5. The apparatus of claim 1, wherein the mesh comprises a plurality of openings, wherein the openings are rectangular with sides between 1.0 to 2.0 millimeters in length.

6. The apparatus of claim 1, wherein the feeder further comprises two or more feeder unloading regions.

7. An apparatus for sifting granular material, comprising:
 a feeder having a feeder loading region, a feeder unloading region spaced from the feeder loading region, and a rotatable feeding member configured to move the granular material from the feeder loading region to the feeder unloading region;
 a sieve positioned to receive the granular material from the feeder unloading region, the sieve comprising a mesh for separating out larger granules from the granular material, the mesh being positioned at an angle of inclination greater than 0 degrees with respect to horizontal; and
 an agitating flap coupled to the feeding member and configured to rotate with the feeding member and to contact the sieve at least once per rotation.

8. The apparatus set forth in claim 7, wherein the feeder is a screw conveyor and the agitating flap is coupled to a blade of the screw conveyor.

9. The apparatus set forth in claim 7 wherein the feeder unloading region is positioned above the sieve.

10. The apparatus set forth in claim 7 further comprising a receptacle located at a lower end of the sieve for receiving granules of material larger than openings of the mesh.

\* \* \* \* \*